Figure 9:
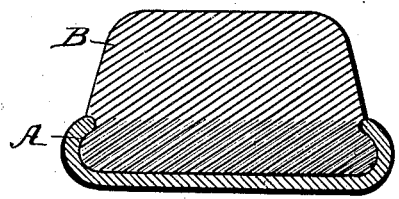

No. 850,747. PATENTED APR. 16, 1907.
I. W. GILES & C. W. TOBEY.
MANUFACTURE AND APPLICATION OF RUBBER TIRES TO WHEEL RIMS.
APPLICATION FILED FEB. 6, 1906.
2 SHEETS—SHEET 1.
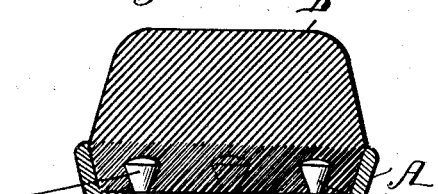
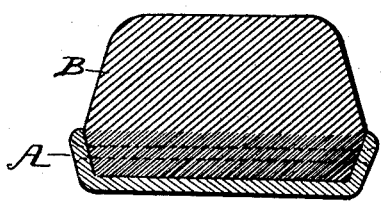
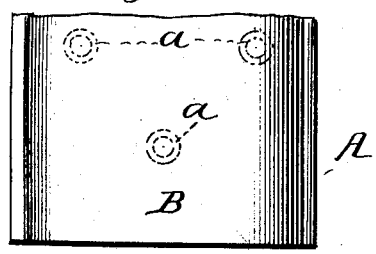
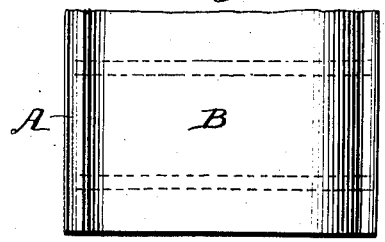
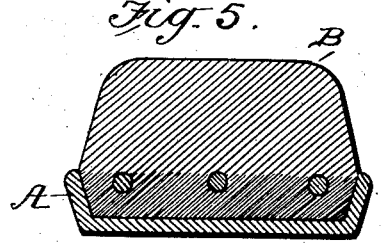
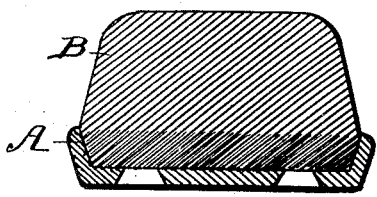
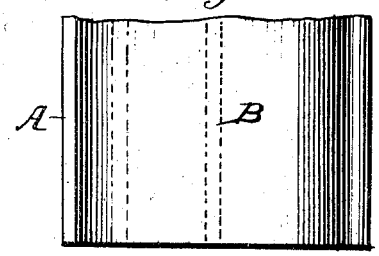
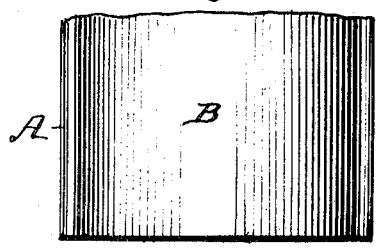
WITNESSES:
Jos. A. Ryan
Geo. L. Brock
INVENTORS
Isaac W. Giles.
Charles W. Tobey.
BY Munn & Co.
ATTORNEYS No. 850,747. PATENTED APR. 16, 1907.
I. W. GILES & C. W. TOBEY.
MANUFACTURE AND APPLICATION OF RUBBER TIRES TO WHEEL RIMS.
APPLICATION FILED FEB. 6, 1906.

2 SHEETS—SHEET 2.

WITNESSES:
Jos. A. Ryan
W. J. Brock

INVENTORS
Isaac W. Giles
Charles W. Tobey
BY Munn & Co.
ATTORNEYS

UNITED STATES PATENT OFFICE.

ISAAC W. GILES, OF NEW BEDFORD, AND CHARLES W. TOBEY, OF FAIRHAVEN, MASSACHUSETTS.

MANUFACTURE AND APPLICATION OF RUBBER TIRES TO WHEEL-RIMS.

No. 850,747.  Specification of Letters Patent.  Patented April 16, 1907.

Application filed February 6, 1906. Serial No. 299,844.

*To all whom it may concern:*

Be it known that we, ISAAC W. GILES, of New Bedford, in the county of Bristol and State of Massachusetts, and CHARLES W. TOBEY, of Fairhaven, in the county of Bristol and State of Massachusetts, both citizens of the United States, have invented a new and useful Improvement in the Manufacture and Application of Rubber Tires to Wheel-Rims, of which the following is a specification.

Our invention relates to improvements in the manufacture and application of rubber tires to wheel-rims, its object being to provide a method whereby rubber tires may be quickly and securely attached to wheel-rims without the use of the usual tools commonly used for that purpose.

With these and other objects in view our invention consists, first, in molding the rubber directly on the rim; it consists, further, in vulcanizing the molded tire on the rim; and it consists, further, in securing the vulcanized molded tire to the rim.

In the drawings forming part of this application we have shown various means for holding the tire and the rim.

Figure 10:
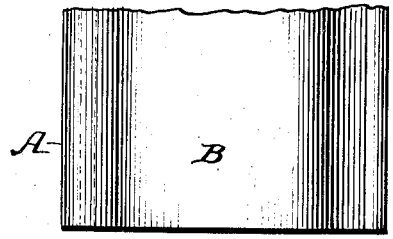
Figure 11:
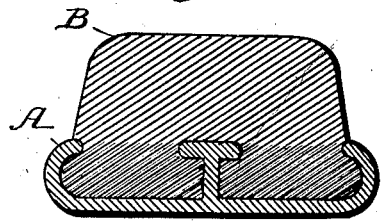
Figure 12:
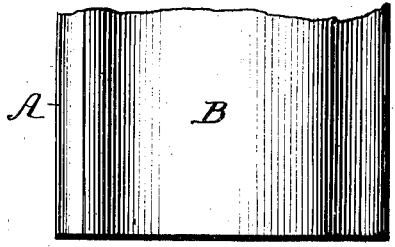

Thus in Figure 1 is shown a rim having upturned edges and cone-shaped studs projecting upwardly from the channel of the rim, the base of said cones projecting upwardly, the studs being placed in staggered relation. Fig. 2 is a plan view of same. Fig. 3 is a sectional view showing use of cross-wires through the rim and tire. Fig. 4 is a plan view of same. Fig. 5 is a sectional view showing use of longitudinal wires embedded in the tire. Fig. 6 is a plan view of the same. Fig. 7 is a sectional view showing undercut openings in the rim to receive and hold the molded tire. Fig. 8 is a plan view of same. Fig. 9 is a sectional view showing a rim with inturned edges to retain the tire in place. Fig. 10 is a plan view of same. Fig. 11 is a sectional view showing a rim with inturned edges and a central T-shaped rib to retain the tire in place. Fig. 12 is a plan view of same.

Heretofore rubber tires have been molded, then vulcanized, and then placed on the rim, being held thereon by various means, such as cementing, binding-wires along the edge of the same, &c. By our invention we propose to mold the tire directly on the rim, formed or shaped as shown in the various figures of the drawings. The tire thus molded is then vulcanized, the vulcanization being so regulated that the portion of tire immediately adjacent to the rim is vulcanized to a degree of hardness greater than the upper portion of the tire. Thus in Fig. 1 the portion of the tire under the heads of the studs *a* is harder than the upper or tread portion of the tire B. The studs *a* are secured to the rim A, as shown.

By our method of making and applying the tires the use of special tools, now necessary, is done away with.

Having thus described our invention, what we claim as new, and desire to secure by Letters Patent, is—

1. The method herein described of manufacturing rubber-tired wheels, consisting of performing the complete operation of molding the rubber tire directly on the rim of the wheel, then vulcanizing the tire so molded to varying degrees of hardness, its hardest portion being immediately adjacent to the rim.

2. The method herein described, of manufacturing rubber-tired wheels, consisting in performing the complete process of molding the rubber directly on the rim of the wheel provided with retaining means adapted to embed themselves in the tire so molded, and then vulcanizing said tire directly on the wheel to varying degrees of hardness, its hardest portion being immediately adjacent to the rim and beneath the retaining means.

ISAAC W. GILES.
CHARLES W. TOBEY.

Witnesses:
GEORGE H. CHASE,
CLIFTON A. HACKER.